Patented July 7, 1936

2,047,128

UNITED STATES PATENT OFFICE 2,047,128

METHOD OF RECOVERING PRECIPITATES

Charles R. Park, Cuyahoga Falls, Ohio, assignor to The Firestone Tire & Rubber Company, Akron, Ohio, a corporation of Ohio No Drawing. Application May 3, 1932, Serial No. 609,049

4 Claims. (Cl. 134—58)

This invention relates to methods of recovering precipitates, and more especially it relates to the recovering and drying of precipitates which ordinarily form hard agglomerates during drying. The invention is especially adapted for the recovery of precipitated pigments such as are used in the rubber and paint industries, wherein it is often impossible satisfactorily to break up the agglomerated pigment in the machinery ordinarily used for incorporating the pigments in paint or rubber mixes.

The chief objects of the invention are to facilitate the drying of precipitated pigments; to obviate the presence of hard agglomerates in the dry pigment; and to produce dry precipitated pigment in soft, friable condition.

As a general statement, the invention may be said to consist in the frothing or aerating of the wet pigment slurry prior to the drying of the same. In order to form the slurry into a thick persistent froth, suitable materials are added thereto, and it has been found that such materials as are used in producing froth in ore flotation processes are of use in this connection.

The following example is illustrative of the steps used in the practice of the improved method. Barium sulfate (BaSO$_4$) and ferric oxide (Fe$_2$O$_3$) are formed in water suspension according to the reaction:

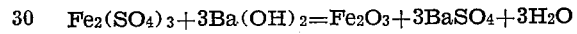

$$Fe_2(SO_4)_3 + 3Ba(OH)_2 = Fe_2O_3 + 3BaSO_4 + 3H_2O$$

If this precipitate is filtered and dried in the ordinary manner it produces a hard cake which cannot be broken down on a rubber-mixing mill, and regardless of how it may be ground, pigment agglomerates will remain.

According to the present invention, the wet slurry is concentrated by filtration or other suitable means until the total solid content is between 15 and 35 per centum, as may be found to be convenient. To the slurry is added a mixture of ammonium stearate, 4% of the dry weight of the pigment, and pine tar, 2% of the dry weight of the pigment, after which the slurry is agitated to induce foaming. Agitating of the slurry may be effected by any convenient method. Passage of the slurry through a colloid mill produces a satisfactory foaming. Another method consists in blowing fine jets of air into the slurry, as by blowing through a fine-grain porous porcelain plate. By any method, the most important consideration is the fineness of the froth since small air bubbles supply greater surface and more stability to the foam.

The slurry in the form of foam is then dried in any suitable manner, the drying being accomplished more rapidly than if it were not foamed, and a finished product is produced that is soft and friable.

Pigments produced in the manner described are easily milled on the usual rubber-working mills, and disperse perfectly in rubber stocks. Also agglomerates are almost completely absent.

The invention is not limited to the use of the specific re-agents mentioned, and other ingredients may be substituted for ammonium stearate; for example, ammonium oleate, triethanolamine oleate, stearate and palmitate. Pine tar may be replaced by other froth-producing agents which are substantially insoluble in or non-miscible with water, including cresylic acid, meta-cresol, and the like, and by wood products, such as pine oil, and the like. In the event that the presence of heavy pine oil is undesirable in the finished product, a light volatile pine oil such as turpentine may be used. The term "oily" used in the appended claims is intended to specify substances having the oily characteristics of the froth producing agents mentioned above.

The invention may be otherwise modified without departing from the spirit of the invention or from the scope of the appended claims.

What is claimed is:

1. The method of recovering paint or rubber pigments from precipitates of the same in a form readily dispersible in oil or rubber which comprises adding to the wet slurry of the precipitates a protective colloid selected from the group consisting of ammonium stearate, ammonium oleate, triethanolamine oleate, triethanolamine stearate, and triethanolamine palmitate, and an oily froth-producing agent which is non-miscible with water, frothing the mixture, and then drying the same.

2. The method of recovering paint or rubber pigments from precipitates of the same in a form readily dispersible in oil or rubber which comprises adding to the wet slurry of the precipitates a protective colloid selected from the group consisting of ammonium stearate, ammonium oleate, triethanolamine oleate, triethanolamine stearate, and triethanolamine palmitate, and an oily froth-producing agent selected from the group of wood products consisting of pine oil, pine tar, and turpentine, frothing the mixture, and then drying the same.

3. The method of recovering paint or rubber pigments from precipitates of the same in a form readily dispersible in oil or rubber which comprises adding to the wet slurry of the precipitates a protective colloid selected from the group consisting of ammonium stearate, ammonium oleate, triethanolamine oleate, triethanolamine stearate, and triethanolamine palmitate, and an oily froth-producing agent selected from the group consisting of cresylic acid and meta-cresol, frothing the mixture, and then drying the same.

4. The method which comprises reacting two or more re-agents to form one or more precipitated paint or rubber pigments in water suspension, adding to the wet slurry of the precipitates a protective colloid selected from the group consisting of ammonium stearate, ammonium oleate, triethanolamine oleate, triethanolamine stearate, and triethanolamine palmitate, and an oily froth-producing agent which is non-miscible with water, frothing the mixture, and then drying the same to produce a dried froth readily dispersible in oil or rubber.

CHARLES R. PARK.